(12) United States Patent
Yamada et al.

(10) Patent No.: US 7,593,163 B2
(45) Date of Patent: Sep. 22, 2009

(54) REAR CONVERTER LENS APPARATUS AND TAKING SYSTEM COMPRISING THE SAME

(75) Inventors: Yasuharu Yamada, Shibuya-ku (JP); Teruhisa Mitsuo, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/231,603

(22) Filed: Sep. 3, 2008

(65) Prior Publication Data

US 2009/0080087 A1    Mar. 26, 2009

(30) Foreign Application Priority Data

Sep. 25, 2007    (JP) ............................. 2007-247515

(51) Int. Cl.
*G02B 15/08*    (2006.01)
*G02B 15/02*    (2006.01)

(52) U.S. Cl. ...................................... 359/675; 359/672

(58) Field of Classification Search ................. 359/672, 359/675
See application file for complete search history.

(56) References Cited

U.S. PATENT DOCUMENTS 4,340,279 A * 7/1982 Ikemori ...................... 359/675

5,253,112 A * 10/1993 Suzuki et al. ............... 359/675
2002/0191303 A1* 12/2002 Yamakawa ................... 359/675
2003/0151827 A1* 8/2003 Tsutsumi ..................... 359/675

FOREIGN PATENT DOCUMENTS

| JP | 60-111215 | 6/1985 |
| JP | 08-184755 | 7/1996 |
| JP | 2002-267929 | 9/2002 |
| JP | 2004-226648 | 8/2004 |

\* cited by examiner

*Primary Examiner*—Scott J Sugarman
(74) *Attorney, Agent, or Firm*—Kenyon & Kenyon LLP

(57) ABSTRACT

The invention relates to a rear converter lens apparatus to obtain a lens system having a focal length longer than that of a master lens device by the mounting of the master lens device, and a taking system comprising the same. A converter lens portion consists of, in order from an object side that is the master lens device side, a first lens group of positive refracting power, a second lens group of positive refracting power and a third lens group of negative refracting power. Between the respective lens groups there is a spacing. The first and second lens groups are located such that of axial air spaces in the converter lens portion, an air space between the first lens group and the second lens group is largest. One each lens group comprises a positive lens element and a negative lens element.

27 Claims, 7 Drawing Sheets

REAR CONVERTER LENS APPARATUS AND TAKING SYSTEM COMPRISING THE SAME

This application claims benefit of Japanese Application No. 2007-247515 filed in Japan on Sep. 25, 2007, the contents of which are incorporated by this reference.

BACKGROUND OF THE INVENTION

The present invention relates to a rear converter lens apparatus to obtain a lens system having a focus length longer than that of a master lens device by the mounting of the master lens device, and an imaging system comprising the same.

So far, there has been a rear converter lens apparatus known in the art, which has mount portions, one each corresponding to the mount portion of a master lens device, and a camera body, so that a converter lens portion is inserted in between the master lens device and the camera body by way of such mount portions to extend the focal length of the whole of a lens system.

Such rear teleconverter lenses are preferably used by users on lens interchangeable, film or digital single-lens reflex cameras.

For instance, Patent Publications 1 and 2 set forth a rear converter lens apparatus as a typical such rear teleconverter lens wherein a converter lens portion has generally a power profile of, from a master lens device portion side, a positive lens group, a negative lens group and a positive lens group, going in favor of correction of aberrations.

With the rear converter lens apparatus of such a power profile shown in Patent Publications 1 and 2, however, the converter lens portion is likely to get close to the master lens device side by reason of the relations of the converter lens portion to the principal points, placing limitations to the type of the master lens device used. This results in poor versatility of the rear converter lens apparatus.

In view of such problems, the invention has for its object the provision of a rear converter lens apparatus that makes it easy to prevent the converter lens portion from getting too close to the master lens device side even at an increased magnification, and to maintain optical performance as well, and an imaging system comprising the same.

Patent Publication 1: JP(A)2002-267929
Patent Publication 2: JP(A)2004-226648

SUMMARY OF THE INVENTION

The invention provides a rear converter lens apparatus, comprising a master lens device-side mount portion adapted to mount a master lens device thereon, a camera body-side mount portion adapted to mount a camera body thereon, and a converter lens portion having generally negative refracting power to obtain a lens system having a focal length longer than that of said master lens device by mounting of said master lens device, characterized in that said converter lens portion comprises, in order from an object side that is said master lens device side, a first lens group of positive refracting power, a second lens group of positive refracting power and a third lens group of negative refracting power; there is a spacing between the respective lens groups; said first lens group and said second lens group are located such that an axial air space between said first lens group and said second lens group is largest in axial air spaces in said converter lens portion; and one each lens group comprises a positive lens and a negative lens.

Thus, the converter lens portion having negative refracting power is inserted in between the master lens device and the camera body by way of the master lens device-side mount portion and the camera body-side mount portion, so that a lens system having a focal length longer than that of the master lens device can be obtained.

The converter lens portion has a power profile of, in order from the object side, positive, positive, and negative power.

Thus, the negative lens group is located nearest to the camera body side, so that it is easy to locate the converter lens portion more on the camera body side with respect to the principal points of the converter lens portion.

Referring to how the respective lens groups are located, there is a spacing between the respective lens groups (meaning that the lens groups are axially separate, or they are in partial contact with each other only near an optical axis), and the first lens group and the second lens group are located such that of axial air spaces in the converter lens portion, the axial air space between the first lens group and the second lens group is largest. Although the combined power of the second and third lens groups is then negative, such arrangement works more for bringing the principal points more on the master lens device side. And the space between the second lens group of positive power and the third lens group of negative power remains narrower than that of the first and the second lens group, so that it is easy to cancel out aberrations at the third lens group, on which negative refracting power concentrates, with the second lens group of positive refracting power.

The first, the second, and the third lens group comprises a positive lens and a negative lens; this goes in favor of reductions of aberrations at each lens group and, hence, higher performance.

Addition of conditions (1) and/or (2) to the first-mentioned requirement for the invention goes more in favor of correction of aberrations and the amount of bulging.

Specifically, it is preferable to satisfy the following condition (1):

$$1.0 \leq |Frc/Bf| \leq 2.2 \tag{1}$$

where Frc is the total focal length of the converter lens portion, and

Bf is the back focus of the combined system of the master lens device and rear converter lens apparatus in the event that the master lens device having an attachable mount portion is mounted on the master lens device-side mount portion.

Condition (1) is to define the preferable relation of the total focal length of the converter lens portion to the back focus.

Abiding by the lower limit to condition (1) goes in favor of correction of aberrations, because of being capable of weakening the negative power of the converter lens portion with respect to the predetermined back focus.

Abiding by the upper limit to condition (1) goes in favor of making sure magnification, because of being capable of shortening the focal length of the converter lens portion with respect to the predetermined back focus.

It is also preferable to satisfy the following condition (2):

$$0.5 \leq |\Sigma d/Frc| \leq 0.8 \tag{2}$$

where $\Sigma d$ is the axial distance of the converter lens portion from the entrance surface of the lens located nearest to the object side to the exit surface of the lens located nearest to the image side, and Frc is a total focal length of the converter lens portion.

Condition (2) is to define the preferable relation of the axial thickness to the total focus length of the converter lens portion.

Abiding by the lower limit to condition (2) facilitates making sure the number of lenses involved and goes in favor of correction of various aberrations, because the thickness of the converter lens portion is ensured with respect to the focal length of the converter lens portion.

Abiding by the upper limit to condition (2) prevents the lens system from growing too thick in the optical axis direction with respect to the focal length of the converter lens portion. This is preferable because it is easy to prevent the master lens portion from getting close to the master lens device side.

According to another embodiment of the invention, the rear converter lens apparatus may be set up as follows.

That is, there is a rear converter lens apparatus provided, which comprises a master lens device-side mount portion adapted to mount a master lens device thereon, a camera body-side mount portion adapted to mount a camera body thereon, and a converter lens portion having generally negative refracting power to obtain a lens system having a focal length longer than that of said master lens device by mounting of said master lens device, characterized in that said converter lens portion comprises, in order from an object side that is said master lens device side, a first lens group of positive refracting power, a second lens group of positive refracting power and a third lens group of negative refracting power, and there is a spacing between the respective lens groups, with satisfaction of the following conditions (1) and (2):

$$1.0 \leq |Frc/bf| \leq 2.2 \quad (1)$$

$$0.5 \leq |\Sigma d/Frc| \leq 0.8 \quad (2)$$

where Frc is the total focal length of the converter lens portion, and

Bf is the back focus of the combined system of the master lens device and rear converter lens apparatus in the event that the master lens device having an attachable mount portion is mounted on the master lens device-side mount portion, and $\Sigma d$ is the axial distance of the converter lens portion from the entrance surface of the lens located nearest to the object side to the exit surface of the lens located nearest to the image side, and Frc is a total focal length of the converter lens portion.

According to this embodiment, the converter lens portion has a power profile of a positive, a positive and a negative power group in order, so that it is easy to prevent the converter lens portion from getting too close to the object side with respect to the principal points.

Condition (1) is to define the preferable relation of the total focal length of the converter lens portion to the back focus.

Abiding by the lower limit to condition (1) goes in favor of correction of aberrations, because of being capable of weakening the negative power of the converter lens portion with respect to the predetermined back focus.

Abiding by the upper limit to condition (1) goes in favor of making sure magnification, because of being capable of shortening the focal length of the converter lens portion with respect to the predetermined back focus.

Condition (2) is to define the preferable relation of the axial thickness to the total focus length of the converter lens portion.

Abiding by the lower limit to condition (2) facilitates making sure the number of lenses involved and goes in favor of correction of various aberrations, because the thickness of the converter lens portion is ensured with respect to the focal length of the converter lens portion.

Abiding by the upper limit to condition (2) prevents the lens system from growing too thick in the optical axis direction with respect to the focal length of the converter lens portion. This is preferable because it is easy to prevent the master lens portion from getting close to the master lens device side.

More preferably in each of the aforesaid embodiments, the following requirements should be satisfied singly or at the same time.

Preferably, the aforesaid first lens group is made up of, in order from the object side, a meniscus lens convex on its object side and having negative refracting power, and a double-convex lens; the aforesaid second lens group is made up of a cemented lens of meniscus shape convex on its image side, wherein said cemented lens comprises, in order from the object side, a double-concave lens and a double-convex lens, and three lenses at most; and the foresaid third lens group is made up of, in order from the object side, a negative lens and a positive lens.

Thus, the generally almost alternate location of positive and negative lenses goes in favor of correction of various aberrations, albeit comprising a reduced number of lenses. On the other hand, the double-concave and double-convex lenses in the second lens group are apt to produce aberrations due to decentration. By cementing together the double-concave and double-convex lenses, however, the influences of decentration on those lenses can be reduced so that much better optical performance is achievable.

Preferably, the following requirement should be satisfied.

Specifically, it is preferable that the third lens is made up of, in order from the object side, a double-concave lens and a meniscus lens convex on its object side and having positive refracting power.

Thus, configuring the object-side negative lens in the third lens group into a double-concave shape and the positive lens into a meniscus shape convex on the object side goes in favor of making sure the third lens group of negative refracting power has negative power. This also permits the convex lens surface shape near the double-concave lens to be convex on the double-concave negative lens side, going in favor of reducing various aberrations such as field curvature.

Preferably, the object-side surface of the aforesaid negative lens in the third lens group has an absolute value of refracting power larger than that of the image-side surface, and the object-side surface of the aforesaid positive lens in the third lens group should have an absolute value of refracting power larger than that of the image-side surface.

It is thus easy to make better aberration balances such as correction of astigmatism.

Preferably, the following requirement is satisfied.

That is, it is preferable that the aforesaid cemented lens in the second lens group is a cemented triplet lens made up of, in order from the object side, the aforesaid double-concave lens, the aforesaid double-convex lens and a meniscus lens convex on its image side.

The double-concave and double-convex lenses in the second lens group are likely to produce aberrations due to decentration. For this reason, if the double-convex lens is sandwiched between both lenses into the cemented triplet lens, then the influences of decentration on those lenses can be much more reduced, and a Petzval image plane, etc. can be corrected to make optical performance much better.

Alternatively, the following requirement may as well be satisfied.

Preferably, the aforesaid cemented lens in the aforesaid second lens group is a cemented doublet lens made up of, in order from the object side, the aforesaid double-concave lens and the aforesaid double-convex lens.

The double-concave and double-convex lenses in the second lens group are likely to produce aberrations due to decentration. For this reason, if the double-convex and double-convex lenses are cemented together into a cemented doublet lens, then the influences of decentration on those lenses can be much more reduced, and a Petzval image plane, etc. can be corrected to make optical performance much better. A decreased lenses count also works for size reductions.

The following requirement may just as well be satisfied.

Preferably, the first lens group is comprised of a cemented lens wherein the aforesaid meniscus lens and the aforesaid double-convex lens are cemented together.

This facilitates holding back the influences of mutual decentration on the lenses in the first lens group, going in favor of improvements in optical performance.

Preferably, the mount surface located in the master lens device-side mount portion and nearest to the object side thereof lies more on the object side than the lens surface located in the aforesaid converter lens portion and nearest to the object side thereof, with satisfaction of the following condition (3):

$$Dmr \geq 4.0 \text{ mm} \qquad (3)$$

where Dmr is an axial distance from the position of the mount surface located nearest to the object side to the lens surface located in the aforesaid converter lens portion and nearest to the object side thereof, provided that the image-side direction is positive.

Abiding by the lower limit to condition (3) makes it easy to prevent interferences of the first lens of the aforesaid rear converter lens apparatus with the lens located in the master lens device and nearest to the image side thereof even when it bulges out of the mount surface toward the image side, so that restrictions on the available master lens systems are eased.

Condition (3) may as well have some upper limit, preferably $$5.0 \text{ mm} \leq Dmr \leq 8.0 \text{ mm} \qquad (3')$$

Abiding by the upper limit to condition (3') makes it easy to take hold of a space for receiving the lenses, going in favor of correction of aberrations, etc.

Preferably, the following condition (4) is satisfied:

$$2.4 \leq |F1/Frc| \leq 200.0 \qquad (4)$$

where Frc is the total focal length of the converter lens portion, and

F1 is the focal length of the first lens group in the converter lens portion.

Abiding by the lower limit to condition (4) helps reduce the refracting power of the first lens group, going in favor of correction of various aberrations at the first lens group in the converter lens portion.

Abiding by the upper limit to condition (4) makes sure the first lens group has a function of converging light beams, going in favor of size reductions of the second and subsequent lens groups.

It is also preferable to satisfy the following condition (5):

$$1.4 \leq |F2/Frc| \leq 2.4 \qquad (5)$$

where Frc is the total focal length of the converter lens portion, and

F2 is the focal length of the second lens group in the converter lens portion.

Abiding by the lower limit to condition (5) helps reduce the refracting power of the second lens group, facilitating correction of various aberrations.

Abiding by the upper limit to condition (5) makes sure the second lens group has a converging function, going in favor of size reductions of the third lens group.

It is preferable to satisfy the following condition (6):

$$0.2 \leq |F3/Frc| \leq 1.2 \qquad (6)$$

where Frc is the total focal-length of the converter lens portion, and

F3 is the focal length of the third lens group in the converter lens portion.

Abiding by the lower limit to condition (6) helps reduce the refracting power of the third lens group in the converter lens portion and sets the back focus to an appropriate length, going in favor of size reductions of the whole converter lens portion, and reductions of aberrations at the third lens group as well.

Abiding by the upper limit to condition (6) facilitates making sure the predetermined back focus.

It is preferable to satisfy the following condition (7):

$$1.8 \leq \beta \leq 2.3 \qquad (7)$$

where $\beta$ is the imaging magnification of the converter lens portion.

It is preferable to abide by the lower limit to condition (7) so as to take hold of magnification, making sure the converter lens portion functions well as a tele-converter (adapted to blow up an object afar off).

It is preferable to abide by the upper limit to condition (7) so as to prevent the magnification of the converter lens group from growing too high, so that the negative power of the whole system is kept small to facilitate correction of various aberrations, offering a sensible tradeoff between size reductions and optical performance.

The aforesaid rear converter lens apparatus may be used on a variety of lens interchangeable single-lens reflex cameras (e.g., film or digital single-lens reflex cameras), compact cameras, etc.

In other words, if the rear converter lens apparatus is combined with a camera body or interchangeable lenses, then it is possible to set up a taking system comprising a master lens device having a mount portion attachable in place by way of the aforesaid master lens device-side mount portion of the aforesaid rear converter lens apparatus and a camera body having a mount portion attachable in place by way of the aforesaid camera body-side mount portion of the aforesaid rear converter lens apparatus.

Preferably, some or all of the aforesaid inventions are satisfied simultaneously.

Preferably, some or all of the aforesaid conditions are satisfied simultaneously.

More preferably, the aforesaid conditions should be narrowed down as follows.

The lower and upper limit values of condition (1) should be set at 1.2, especially 1.3 and 2.0, especially 1.8, respectively.

The lower and upper limit values of condition (2) should be set at 0.55, especially 0.6 and 0.75, especially 0.7, respectively.

The lower and upper limit values of condition (3), (3') should be set at 4.5 mm, especially 5.0 mm and 7.0 mm, especially 6.0 mm, respectively.

The lower and upper limit values of condition (4) should be set at 2.5, especially 2.8 and 80, especially 3.4, respectively.

The lower and upper limit values of condition (5) should be set at 1.5, especially 1.6 and 2.2, especially 2.0, respectively.

The lower and upper limit values of condition (6) should be set at 0.4, especially 0.6 and 1.0, especially 0.8, respectively.

The lower and upper limit values of condition (7) should be set at 1.9 and 2.1, respectively.

It is thus possible to provide a rear converter lens apparatus that, event at high magnifications, prevents the converter master lens portion from getting too close to the master lens device side and can easily have optical performance as well, and a taking system comprising the same.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

Some embodiments of the invention are now explained.

In both Examples 1 and 2, the setups of lens and mount portions in the master lens device are the same.

Figure 1:
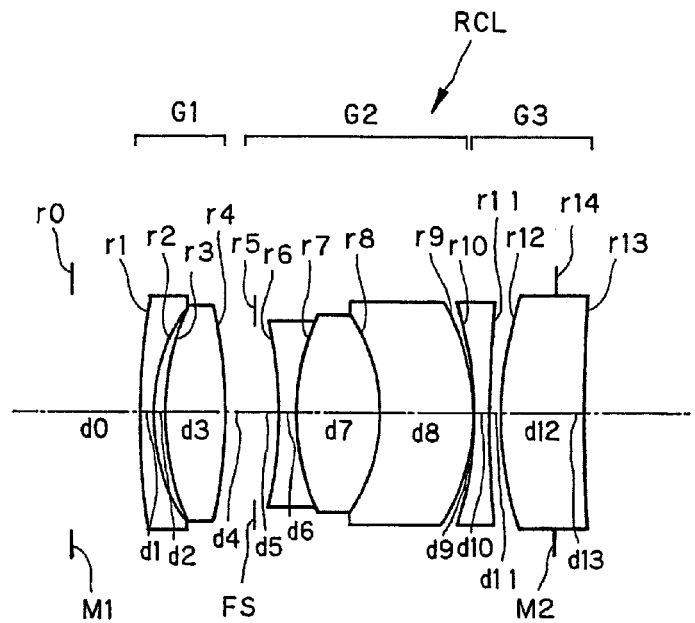
FIG. 1 is illustrative in section of the setup of the rear converter lens according to Example 1.
Figure 2:
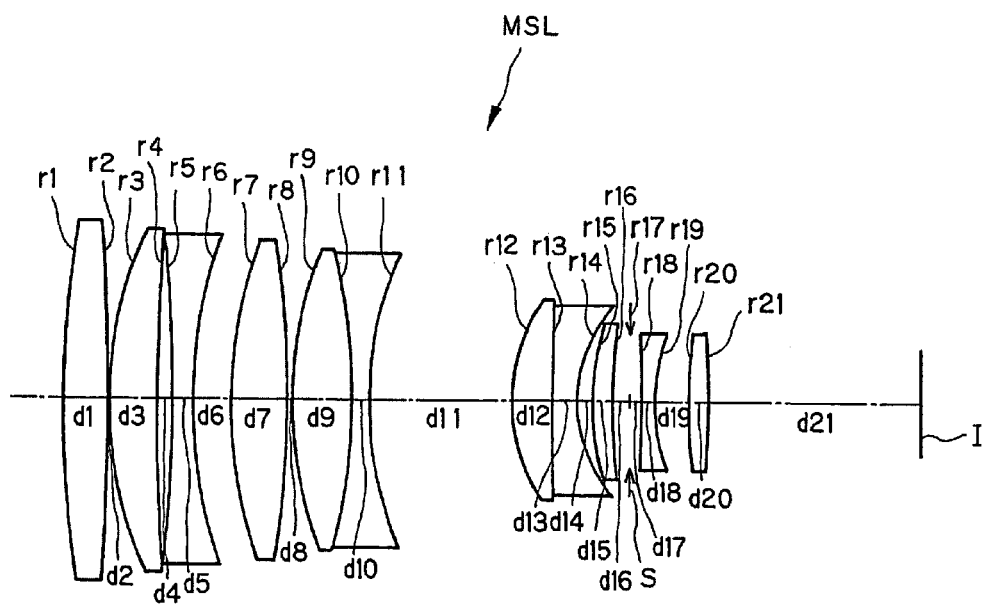
FIG. 2 is illustrative in section of the setup of one exemplary master lens having the inventive rear converter lens attached to its rear side.
Figure 3:
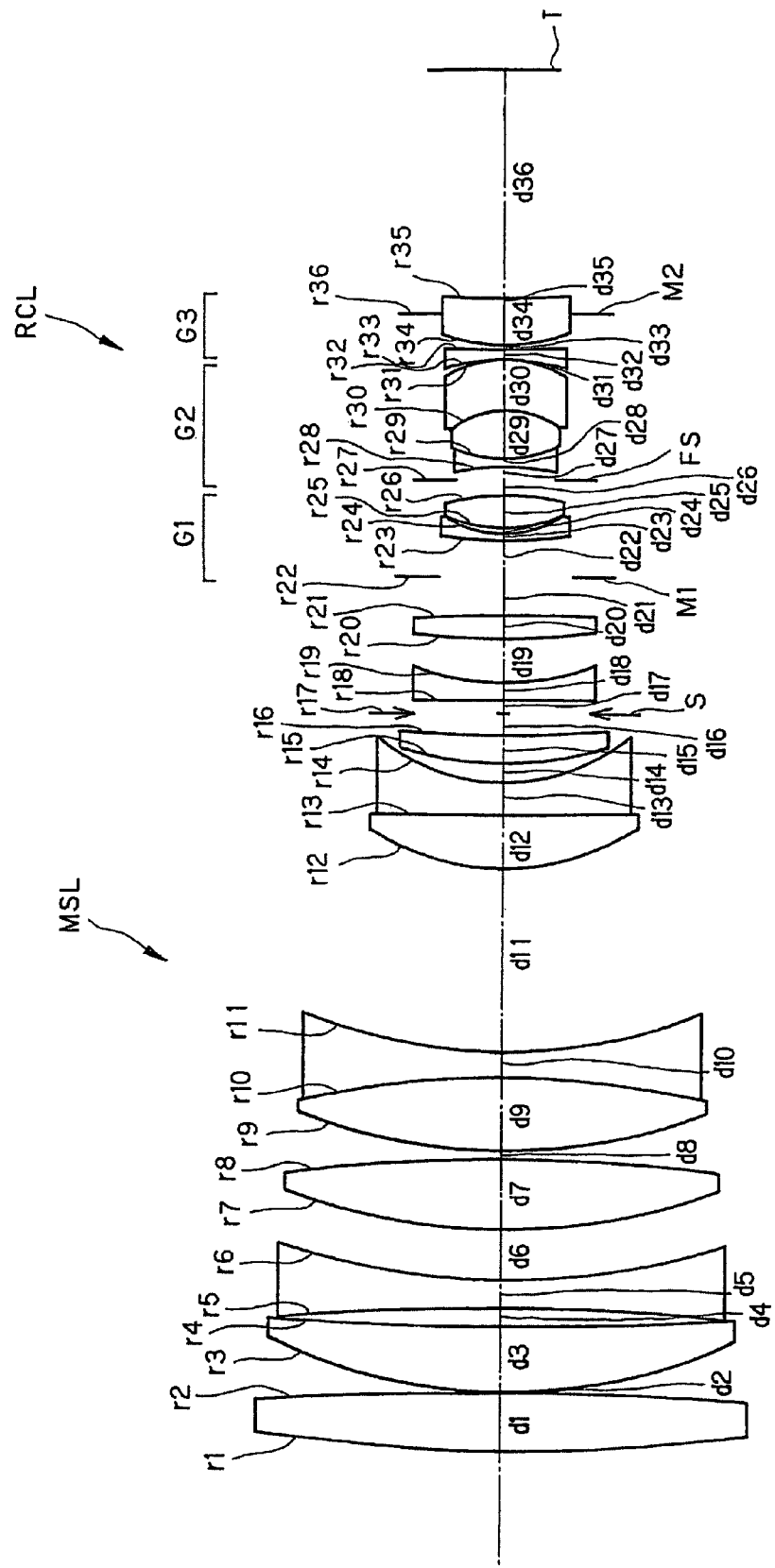
FIG. 3 is illustrative in section of the rear converter lens of Example 1 attached to the rear side of the master lens of FIG. 2.
Figure 4:
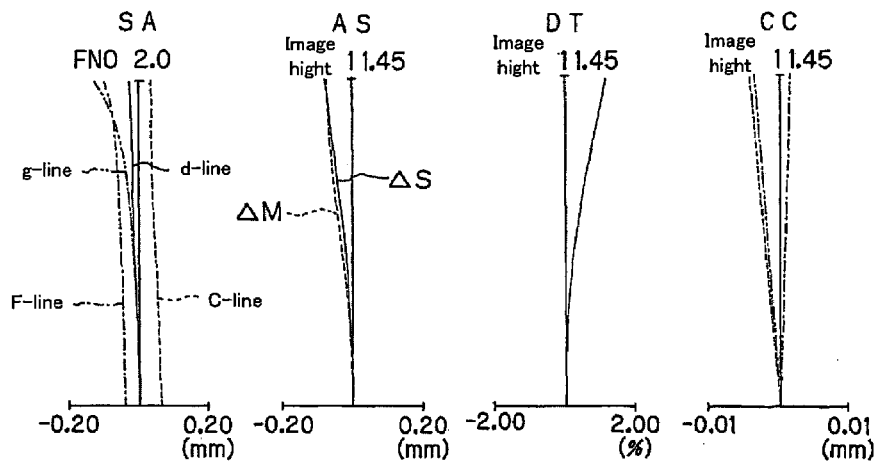
FIG. 4 is an aberration diagram for various aberrations of the master lens of FIG. 2 upon focusing at infinity.
Figure 5:
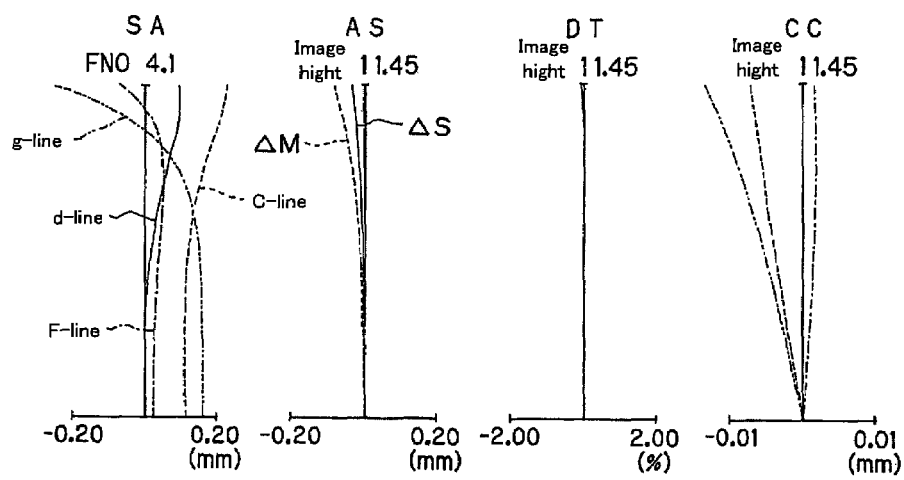
FIG. 5 is an aberration diagram for various aberrations where the rear converter lens of Example 1 is attached to the rear side of the master lens of FIG. 2.

An optical system according to inventive Example 1 is explained. FIG. 1 is illustrative in section of the setup of the rear converter lens according to Example 1; FIG. 2 is illustrative in section of the setup of one exemplary master lens having the inventive rear converter lens attached to its rear side; FIG. 3 is illustrative in section of the rear converter lens of Example 1 attached to the rear side of the master lens of FIG. 2; FIG. 4 is an aberration diagram for various aberrations of the master lens of FIG. 2 as it is focused at infinity; and FIG. 5 is an aberration diagram for various aberrations where the rear converter lens of Example 1 is attached to the rear side of the master lens of FIG. 2. For spherical aberrations and chromatic aberration of magnification, there are values indicated at the respective wavelengths of 587.6 nm (d-line: a solid line), 435.8 nm (g-line: a two-dotted chain line), 486.1 nm (F-line; a one-dotted chain line) and 656.3 nm (C-line: a dotted line), and for astigmatism, solid and dotted lines are indicative of sagittal and meridional image planes, respectively.

Comprising a focusing movable lens, the master lens is designed to make correction of image position misalignments due to a subject distance, the converter lens attached to it, and the type of the camera body involved.

Throughout the drawings, MSL is indicative of the master lens, RCL the rear converter lens, G1 the first lens group, G2 the second lens group, G3 the third lens group, MI the object-side mount portion, M2 the image-side mount portion, S the stop, and I the image plane of a CCD that is an electronic imaging device.

As shown in FIG. 1, the rear converter lens RCL of Example 1 is made up of, in order from the object side, the object-side mount portion M1, the first lens group G1 of positive refracting power, a flare stop FS, the second lens group G2 of positive refracting power, the third lens group G3 of negative refracting power, and the image-side mount portion M2.

In order from the object side, the first lens group G1 is made up of a negative meniscus lens convex on its object side and a double-convex positive lens; the second lens group G2 is made up of a cemented lens consisting of a double-concave negative lens, a double-convex positive lens and a negative meniscus lens convex on its image side; and the third lens group G3 is made up of a double-concave negative lens and a positive meniscus lens convex on its object side.

As shown in FIG. 2, the master lens MSL of Example 1 is made up of, in order from the object side, a double-convex positive lens, a positive meniscus lens convex on its object side, a double-concave negative lens, a double-convex positive lens, a cemented lens of a double-convex positive lens and a double-concave negative lens, a cemented lens of a positive meniscus lens convex on its object side and a negative meniscus lens convex on its object side, a positive meniscus lens convex on its object side, stop S, a double-concave negative lens and a double-convex positive lens.

FIG. 3 is illustrative in section of the master lens of FIG. 2 having the rear converter lens of inventive Example 1 attached to its rear side. Where the rear converter lens is attached to the rear side of the master lens, the master lens MSL is made up of, in order from the object side, a double-convex positive lens, a positive meniscus lens convex on its object side, a double-concave negative lens, a double-convex positive lens, a cemented lens of a double-convex positive lens and a double-concave negative lens, a cemented lens of a positive meniscus lens convex on its object side and a negative meniscus lens convex on its object side, a positive meniscus lens convex on its object side, stop S, a double-concave negative lens and a double-convex positive lens.

The rear converter lens RCL is made up of, in order from the object side, the object-side mount portion M1, the first lens group G1 of positive refracting power, the flare stop FS, the second lens group G2 of positive refracting power, the third lens group G3 of negative refracting power and the image-side mount portion M2.

In order from the object side, the first lens group G1 is made up of a negative meniscus lens convex on its object side and a double-convex positive lens; the second lens group G2 is made up of a cemented lens consisting of a double-concave negative lens, a double-convex positive lens and a negative meniscus lens convex on its image side; and the third lens group G3 is made up of a double-concave negative lens and a positive meniscus lens convex on its object side.

Figure 6:
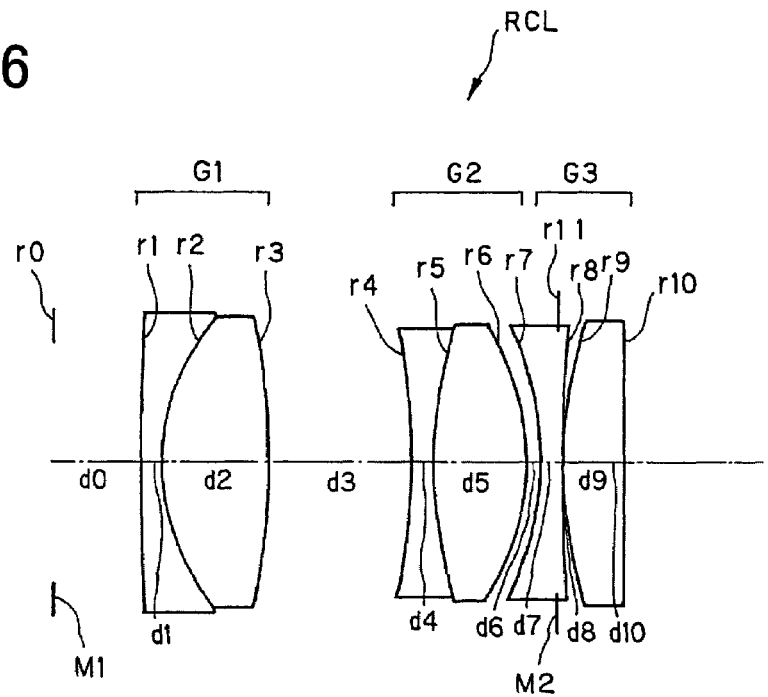
FIG. 6 is illustrative in section of the setup of the rear converter lens of Example 2.
Figure 7:
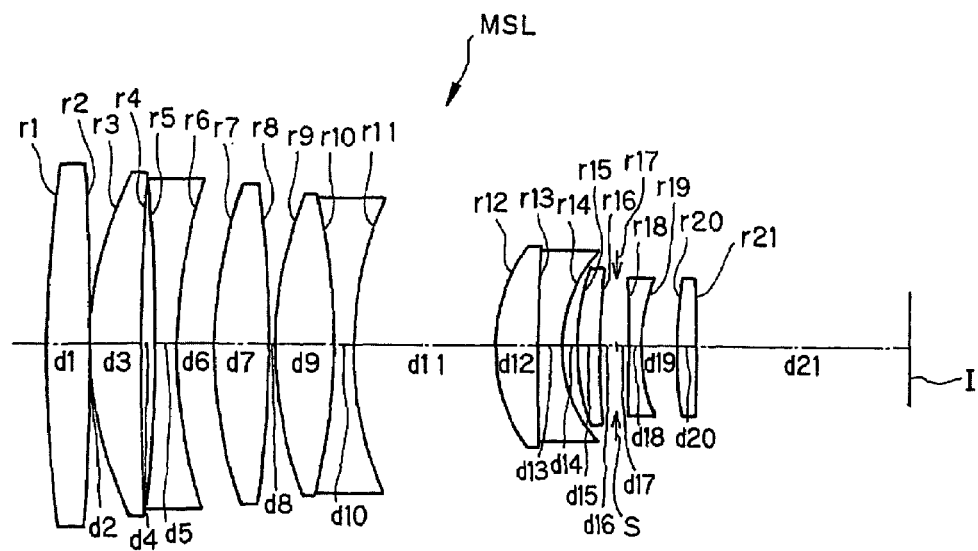
FIG. 7 is illustrative in section of one exemplary master lens having the inventive rear converter lens attached to its rear side.
Figure 8:
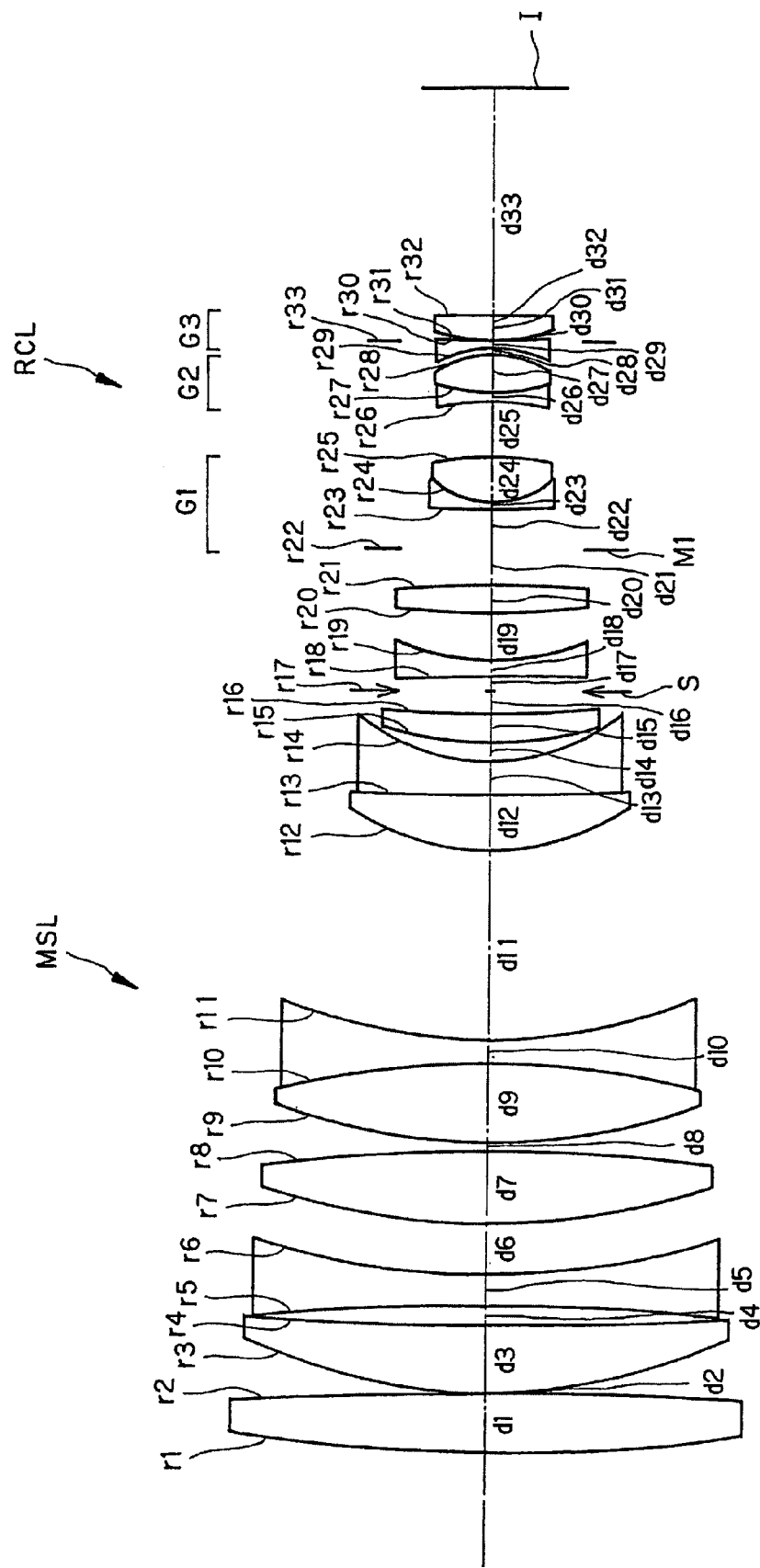
FIG. 8 is illustrative in section of the rear converter lens of Example 2 attached to the rear side of the master lens of FIG. 7.
Figure 9:
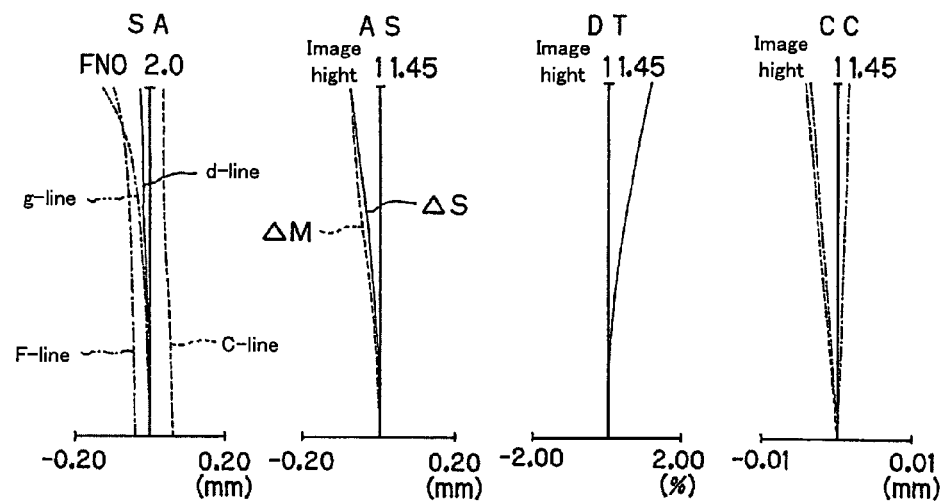
FIG. 9 is an aberration diagram for various aberrations of the master lens of FIG. 7 upon focusing at infinity.
Figure 10:
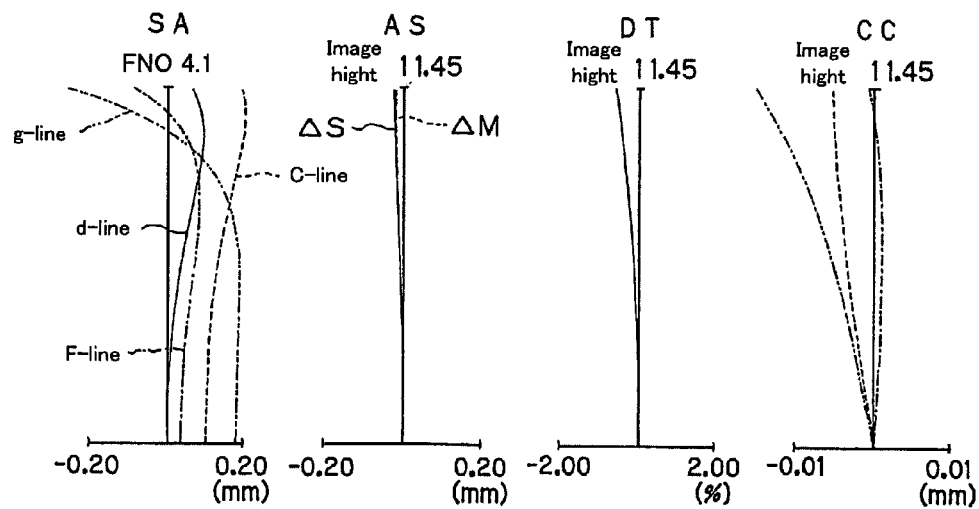
FIG. 10 is an aberration diagram for various aberrations where the rear converter lens of Example 2 is attached to the rear side of the master lens of FIG. 7.

An optical system of inventive Example 2 is now explained. FIG. 6 is illustrative in section of the setup of the rear converter lens of Example 2; FIG. 7 is illustrative in section of one exemplary master lens having the inventive rear converter lens attached to its rear side; FIG. 8 is illustrative in section of the rear converter lens of Example 2 attached to the rear side of the master lens of FIG. 7; FIG. 9 is an aberration diagram for various aberrations of the master lens of FIG. 7 upon focusing at infinity; and FIG. 10 is an aberration diagram for various aberrations where the rear converter lens of Example 2 shown in FIG. 6 is attached to the rear side of the master lens of FIG. 7. For spherical aberrations and chromatic aberration of magnification, there are values indicated at the respective wavelengths of 587.6 nm (d-line: a solid line), 435.8 nm (g-line: a two-dotted chain line), 486.1 nm (F-line; a one-dotted chain line) and 656.3 nm (C-line: a dotted line), and for astigmatism, solid and dotted lines are indicative of sagittal and meridional image planes, respectively.

Comprising a focusing movable lens, the master lens is designed to make correction of image position misalignments due to a subject distance, the converter lens attached to it, and the type of the camera body involved.

Throughout the drawings, MSL is indicative of the master lens, RCL the rear converter lens, G1 the first lens group, G2 the second lens group, G3 the third lens group, M1 the object-side mount portion, M2 the image-side mount portion, S the stop, and I the image plane of a CCD that is an electronic imaging device.

As shown in FIG. 6, the rear converter lens RCL of Example 2 is made up of, in order from the object side, the object-side mount portion M1, the first lens group G1 of positive refracting power, the second lens group G2 of positive refracting power, the third lens group G3 of negative refracting power, and the image-side mount portion M2.

In order from the object side, the first lens group G1 is made up of cemented lens of a negative meniscus lens convex on its object side and a double-convex positive lens; the second lens group G2 is made up of a cemented lens of a double-concave negative lens and a double-convex positive lens; and the third lens group G3 is made up of a plano-convex positive lens convex on its object side.

As shown in FIG. 7, the master lens MSL of Example 2 is made up of, in order from the object side, a double-convex positive lens, a positive meniscus lens convex on its object side, a double-concave negative lens, a double-convex positive lens, a cemented lens of a double-convex positive lens and a double-concave negative lens, a cemented lens of a positive meniscus lens convex on its object side and a negative meniscus lens convex on its object side, a positive meniscus lens convex on its object side, a stop S, a double-concave negative lens and a double-convex positive lens.

FIG. 8 is illustrative in section of the master lens of FIG. 7 having the rear converter lens of inventive Example 2 attached to its rear side. Where the rear converter lens is attached to the rear side of the master lens, the master lens MSL is made up of, in order from the object side, a double-convex positive lens, a positive meniscus lens convex on its object side, a double-concave negative lens, a double-convex positive lens, a cemented lens of a double-convex positive lens and a double-concave negative lens, a cemented lens of a positive meniscus lens convex on its object side and a negative meniscus lens convex on its object side, a positive meniscus lens convex on its object side, a stop S, a double-concave negative lens and a double-convex positive lens.

The rear converter lens RCL is made up of, in order from the object side, the object-side mount portion M1, the first lens group G1 of positive refracting power, the second lens group G2 of positive refracting power, the third lens group G3 of negative refracting power and the image-side mount portion M2.

In order from the object side, the first lens group G1 is made up of a cemented lens of a negative meniscus lens convex on its object side and a double-convex positive lens; the second lens group G2 is made up of a cemented lens of a double-concave negative lens and a double-convex positive lens; and the third lens group G3 is made up of a double-concave negative lens and a plano-convex positive lens convex on its object side.

Set out below are numerical data on each example. The numerical data are indicative of lens data about the rear converter lens apparatus inclusive of the object-side mount portion, the image-side mount portion, the setup of each lens, and the position of the flare stop, lens data about the lens portion in the master lens device, and lens data where the rear converter lens apparatus and the master lens device are assembled together by way of the respective lens mounts.

In each example, f is a focal length, Fno is an F-number, β is an imaging magnification, S is a surface number, r is the paraxial radius of curvature of a lens surface, d is the thickness of and an air space across a lens, and Nd and vd are a refractive index and an Abbe constant at the d-line ($\lambda$=587.6 nm), respectively.

EXAMPLE 1

Unit mm

Rear Converter Lens

Surface Data

| surface number | r | d | nd | vd |
| --- | --- | --- | --- | --- |
| 0 (object-side mount surface) | ∞ | 5.80 | | |
| 1 | 65.040 | 1.35 | 1.88300 | 40.76 |
| 2 | 17.937 | 0.79 | | |
| 3 | 22.652 | 5.20 | 1.59270 | 35.31 |
| 4 | −44.108 | 2.50 | | |
| 5 (flare stop) | ∞ | 2.15 | | |
| 6 | −38.040 | 1.35 | 1.81600 | 46.62 |
| 7 | 21.904 | 7.50 | 1.59270 | 35.31 |
| 8 | −14.907 | 8.00 | 1.69680 | 55.53 |
| 9 | −19.274 | 0.15 | | |
| 10 | −33.494 | 1.35 | 1.90366 | 31.31 |
| 11 | 125.801 | 0.97 | | |
| 12 | 33.222 | 7.14 | 1.51633 | 64.14 |
| 13 | 150.252 | −2.45 | | |
| 14 (image-side mount surface) data | ∞ | | | |
| focal length | −62.498 | | | |

Master Lens

Surface Data

| surface number | r | d | nd | vd |
|---|---|---|---|---|
| object surface | ∞ | ∞ | | |
| 1 | 279.889 | 9.12 | 1.48749 | 70.23 |
| 2 | −653.223 | 0.20 | | |
| 3 | 86.709 | 10.53 | 1.49700 | 81.54 |
| 4 | 672.762 | 3.06 | | |
| 5 | −372.773 | 4.46 | 1.78472 | 25.68 |
| 6 | 115.609 | 7.86 | | |
| 7 | 103.086 | 11.70 | 1.43875 | 94.93 |
| 8 | −247.813 | 1.00 | | |
| 9 | 89.628 | 12.30 | 1.78472 | 25.68 |
| 10 | −137.907 | 3.85 | 1.74400 | 44.78 |
| 11 | 80.187 | 29.7593 | | |
| 12 | 36.976 | 9.00 | 1.62280 | 57.05 |
| 13 | 548.969 | 5.19 | 1.71736 | 29.52 |
| 14 | 30.722 | 3.10 | | |
| 15 | 55.913 | 4.40 | 1.80518 | 25.42 |
| 16 | 148.254 | 3.60 | | |
| 17 (stop) | ∞ | 2.50 | | |
| 18 | −672.762 | 2.60 | 1.60342 | 38.03 |
| 19 | 38.839 | 7.30 | | |
| 20 | 104.607 | 4.20 | 1.78800 | 47.37 |
| 21 | −301.318 | 44.5951 | | |
| image surface | ∞ | | | | data

| focal length | 149.50 |
|---|---|
| F-number | 2.0 |
| half angle of view | 4.4° |
| image height | 11.45 |
| lens length | 180.32 |
| BF | 44.5951 | master lens having rear converter lens attached to its rear side

Surface Data

| surface number | r | d | nd | vd |
|---|---|---|---|---|
| object surface | ∞ | ∞ | | |
| 1 | 279.889 | 9.12 | 1.48749 | 70.23 |
| 2 | −653.223 | 0.20 | | |
| 3 | 86.709 | 10.53 | 1.49700 | 81.54 |
| 4 | 672.762 | 3.06 | | |
| 5 | −372.773 | 4.46 | 1.78472 | 25.68 |
| 6 | 115.609 | 7.86 | | |
| 7 | 103.086 | 11.70 | 1.43875 | 94.93 |
| 8 | −247.813 | 1.00 | | |
| 9 | 89.628 | 12.30 | 1.78472 | 25.68 |
| 10 | −137.907 | 3.85 | 1.74400 | 44.78 |
| 11 | 80.187 | 29.7593 | | |
| 12 | 36.976 | 9.00 | 1.62280 | 57.05 |
| 13 | 548.969 | 5.19 | 1.71736 | 29.52 |
| 14 | 30.722 | 3.10 | | |
| 15 | 55.913 | 4.40 | 1.80518 | 25.42 |
| 16 | 148.254 | 3.60 | | |
| 17 (stop) | ∞ | 2.50 | | |
| 18 | −672.762 | 2.60 | 1.60342 | 38.03 |
| 19 | 38.839 | 7.30 | | |
| 20 | 104.607 | 4.20 | 1.78800 | 47.37 |
| 21 | −301.318 | 6.0068 | | |
| 22 (object-side mount surface) | ∞ | 5.80 | | |
| 23 | 65.040 | 1.35 | 1.88300 | 40.76 |
| 24 | 17.937 | 0.79 | | |
| 25 | 22.652 | 5.20 | 1.59270 | 35.31 |
| 26 | −44.108 | 2.50 | | |
| 27 (flare stop) | ∞ | 2.15 | | |
| 28 | −38.040 | 1.35 | 1.81600 | 46.62 |
| 29 | 21.904 | 7.50 | 1.59270 | 35.31 |
| 30 | −14.907 | 8.00 | 1.69680 | 55.53 |
| 31 | −19.274 | 0.15 | | |
| 32 | −33.494 | 1.35 | 1.90366 | 31.31 |
| 33 | 125.801 | 0.97 | | |
| 34 | 33.222 | 7.14 | 1.51633 | 64.14 |
| 35 | 150.252 | −2.45 | | |
| 36 (image-side mount surface) | ∞ | 38.6043 | | |
| image surface | ∞ | | | | data

| focal length | 299.07 |
|---|---|
| F-number | 4.1 |
| half angle of view | 2.2° |
| image height | 11.45 |
| lens length | 222.14 |
| BF | 36.1543 |

EXAMPLE 2

Unit mm

Rear Converter Lens

Surface Data

| surface number | r | d | nd | vd |
|---|---|---|---|---|
| 0 (object-side mount surface) | ∞ | 5.80 | | |
| 1 | 200.000 | 1.30 | 1.88300 | 40.76 |
| 2 | 14.472 | 6.67 | 1.62588 | 35.7 |
| 3 | −48.413 | 8.80 | | |
| 4 | −43.729 | 1.30 | 1.88300 | 40.76 |
| 5 | 28.559 | 5.93 | 1.60342 | 38.03 |
| 6 | −16.233 | 0.83 | | |
| 7 | −20.522 | 1.30 | 1.80400 | 46.57 |
| 8 | 103.026 | 0.10 | | |
| 9 | 31.046 | 3.66 | 1.53996 | 59.46 |
| 10 | ∞ | −4.00 | | |
| 11 (image-side mount surface) | ∞ | | | | data

| focal length | −45.995 |
|---|---|

Master Lens

Surface Data

| surface number | r | d | nd | vd |
|---|---|---|---|---|
| object surface | ∞ | ∞ | | |
| 1 | 279.889 | 9.12 | 1.48749 | 70.23 |
| 2 | −653.223 | 0.20 | | |
| 3 | 86.709 | 10.53 | 1.49700 | 81.54 |
| 4 | 672.762 | 3.06 | | |
| 5 | −372.773 | 4.46 | 1.78472 | 25.68 |
| 6 | 115.609 | 7.86 | | |
| 7 | 103.086 | 11.70 | 1.43875 | 94.93 |
| 8 | −247.813 | 1.00 | | |
| 9 | 89.628 | 12.30 | 1.78472 | 25.68 |
| 10 | −137.907 | 3.85 | 1.74400 | 44.78 |
| 11 | 80.187 | 29.7593 | | |
| 12 | 36.976 | 9.00 | 1.62280 | 57.05 |
| 13 | 548.969 | 5.19 | 1.71736 | 29.52 |

-continued

| surface number | r | d | nd | vd |
|---|---|---|---|---|
| 14 | 30.722 | 3.10 | | |
| 15 | 55.913 | 4.40 | 1.80518 | 25.42 |
| 16 | 148.254 | 3.60 | | |
| 17 (stop) | ∞ | 2.50 | | |
| 18 | −672.762 | 2.60 | 1.60342 | 38.03 |
| 19 | 38.839 | 7.30 | | |
| 20 | 104.607 | 4.20 | 1.78800 | 47.37 |
| 21 | −301.318 | 44.5951 | | |
| image surface | ∞ | | | | image data

| | |
|---|---|
| focal length | 149.50 |
| F-number | 2.0 |
| half angle of view | 4.4° |
| image height | 11.45 |
| lens length | 180.32 |
| BF | 44.5951 | master lens having rear converter lens attached to its rear side

Surface Data

| surface number | r | d | nd | vd |
|---|---|---|---|---|
| object surface | ∞ | ∞ | | |
| 1 | 279.889 | 9.12 | 1.48749 | 70.23 |
| 2 | −653.223 | 0.20 | | |
| 3 | 86.709 | 10.53 | 1.49700 | 81.54 |
| 4 | 672.762 | 3.06 | | |
| 5 | −372.773 | 4.46 | 1.78472 | 25.68 |
| 6 | 115.609 | 7.86 | | |
| 7 | 103.086 | 11.70 | 1.43875 | 94.93 |
| 8 | −247.813 | 1.00 | | |
| 9 | 89.628 | 12.30 | 1.78472 | 25.68 |
| 10 | −137.907 | 3.85 | 1.74400 | 44.78 |
| 11 | 80.187 | 29.7593 | | |
| 12 | 36.976 | 9.00 | 1.62280 | 57.05 |
| 13 | 548.969 | 5.19 | 1.71736 | 29.52 |
| 14 | 30.722 | 3.10 | | |
| 15 | 55.913 | 4.40 | 1.80518 | 25.42 |
| 16 | 148.254 | 3.60 | | |
| 17 (stop) | ∞ | 2.50 | | |
| 18 | −672.762 | 2.60 | 1.60342 | 38.03 |
| 19 | 38.839 | 7.30 | | |
| 20 | 104.607 | 4.20 | 1.78800 | 47.37 |
| 21 | −301.318 | 6.0068 | | |
| 22 (object-side mount surface) | ∞ | 5.80 | | |
| 23 | 200.000 | 1.30 | 1.88300 | 40.76 |
| 24 | 14.472 | 6.67 | 1.62588 | 35.7 |
| 25 | −48.413 | 8.80 | | |
| 26 | −43.729 | 1.30 | 1.88300 | 40.76 |
| 27 | 28.559 | 5.93 | 1.60342 | 38.03 |
| 28 | −16.233 | 0.83 | | |
| 29 | −20.522 | 1.30 | 1.80400 | 46.57 |
| 30 | 103.026 | 0.10 | | |
| 31 | 31.046 | 3.66 | 1.53996 | 59.46 |
| 32 | ∞ | −4.00 | | |
| 33 (image-side mount surface) | ∞ | 38.5936 | | |
| image. surface | ∞ | | | | data

| | |
|---|---|
| focal length | 299.17 |
| F-number | 4.1 |
| half angle of view | 2.2° |
| image height | 11.45 |
| lens length | 222.04 |
| BF | 34.5936 |

Set out below are the values of the conditions in the respective examples.

| condition | example 1 | example 2 |
|---|---|---|
| (1) | 1.729 | 1.329 |
| (2) | 0.615 | 0.650 |
| (3) | 5.800 | 5.800 |
| (4) | 2.899 | 73.488 |
| (5) | 1.777 | 1.856 |
| (6) | 0.732 | 0.744 |
| (7) | 2.0 | 2.0 |

Figure 11:
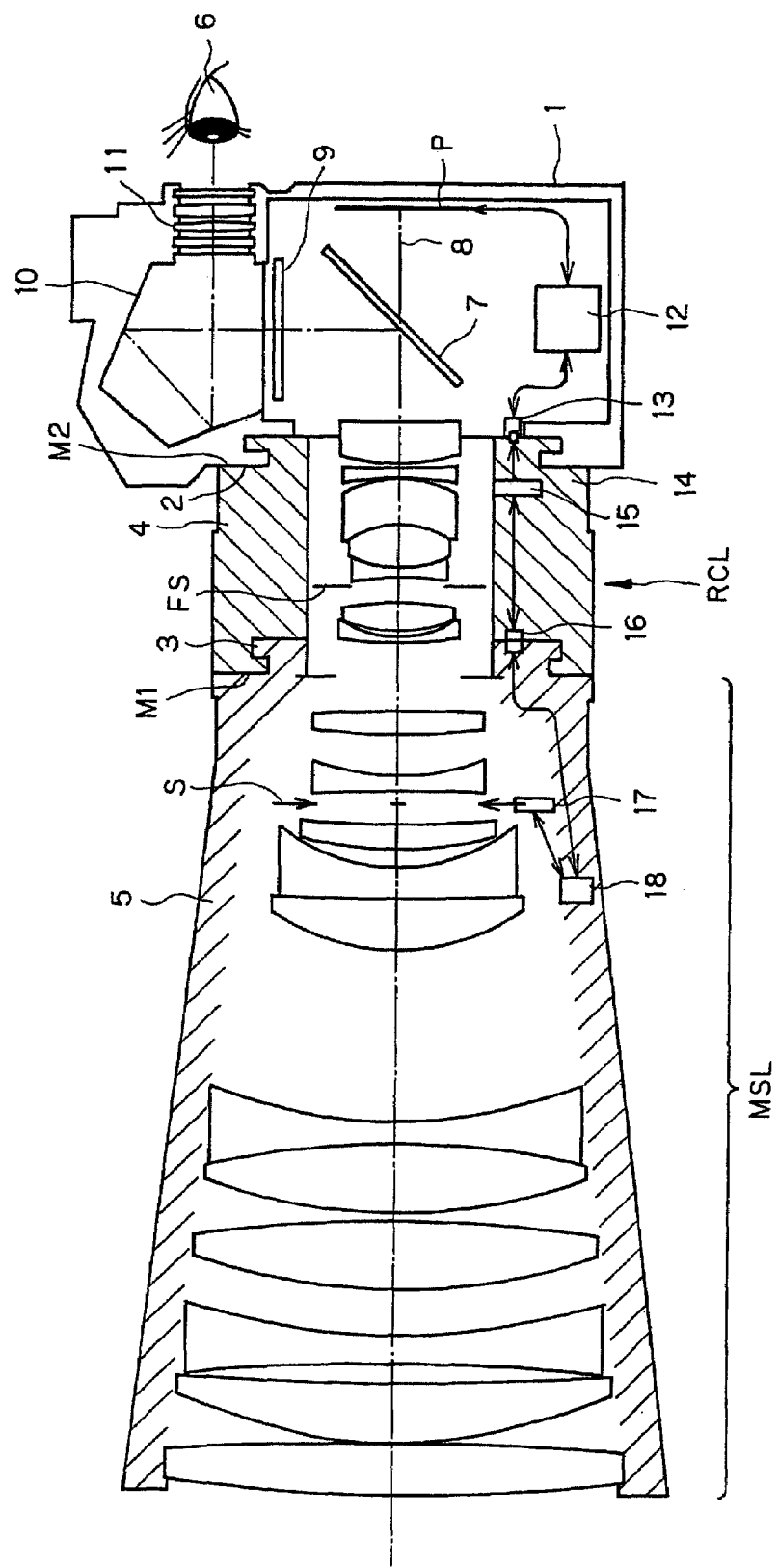
FIG. 11 is illustrative in schematic section of a single-lens reflex camera having a taking lens comprising a combination of the inventive rear converter lens with a master lens device.

FIG. 11 is illustrative in schematic section of a single-lens reflex camera having a taking lens comprising a combination of the inventive rear converter lens with a master lens device. Although the lens portion is schematically illustrated, the aforesaid lens system or the like may be used there.

In FIG. 11, reference numeral 1 is indicative of a single-lens reflex camera in the form of a camera body, and 2 a camera body-side lens portion that enables a holder 5 for the master lens portion ML or a holder 4 for the rear converter lens RCL to be attached to or detached from the single-lens reflex camera 1. Reference numeral 3 is indicative of a mount portion that enables a holder 5 for the master lens MSL to be attached to or detached from the holder 4 for the rear converter lens RCL. The holder 4 in the rear converter lens apparatus, too, includes a mount portion for mounting the master lens device to it, and a mount portion for attachment or detachment of the camera body, and has an object-side mount surface M1 in abutment against the mount portion of the master lens device and an image-side mount surface M2 in abutment against the camera body as it is mounted in place. For those mount portions, for instance, those of the screw type or bayonet type may be used (in FIG. 11, the bayonet type mount is used).

P is indicative of an imaging plane of an electronic imaging device such as CCDs, a film or the like, 6 an observer's eye (eye point), 7 a quick return mirror located between a taking lens and the imaging plane P on an optical path through the taking lens, 9 a finder screen located on a path taken by light reflected off the quick return mirror 7, 10 a penta prism, and 11 a finder lens portion. Reference numerals 12, 15 and 18 are control circuits for adjustment of stops, focal length, focusing or the like, 13 and 16 electrical contacts for making electrical connections between the master lens device MSL and rear converter lens RCL and the camera body, and transmitting signals for the aforesaid adjustment and control, and 17 is a control portion for the stop S. The inventive rear converter lens apparatus may be used as the taking lens (rear converter lens) in the single-lens reflex camera of such construction as described above.

What is claimed is:

1. A rear converter lens apparatus, comprising:
   a master lens device-side mount portion for mounting a master lens device thereon,
   a camera body-side mount portion for mounting a camera body thereon, and
   a converter lens portion having generally negative refracting power so as to obtain a lens system having a focal length longer than that of said master lens device by mounting said master lens device, wherein:
   said converter lens portion consists of, in order from an object side that is said master lens device side, a first lens group of positive refracting power, a second lens group of positive refracting power and a third lens group of negative refracting power;

there is a spacing between the respective lens groups;

said first lens group and said second lens group are located such that an axial air space between said first lens group and said second lens group is largest in axial air spaces in said converter lens portion; and one each lens group comprises a positive lens element and a negative lens element.

2. The rear converter lens apparatus of claim 1, which satisfies the following condition (1):

$$1.0 \leq |Frc/Bf| \leq 2.2 \quad (1)$$

where Frc is a total focal length of the converter lens portion, and

Bf is a back focus of a combined system of the master lens device and rear converter lens apparatus in the event that the master lens device having an attachable mount portion is mounted on the master lens device-side mount portion.

3. The rear converter lens apparatus of claim 1, which satisfies the following condition (2):

$$0.5 \leq |\Sigma d/Frc| \leq 0.8 \quad (2)$$

where Σd is an axial distance of the converter lens portion from an entrance surface of a lens located nearest to the object side to an exit surface of a lens located nearest to the image side, and Frc is a total focal length of the converter lens portion.

4. The rear converter lens apparatus of claim 1, wherein:

said first lens group consists of, in order from the object side, a meniscus lens element convex on its object side and having negative refracting power and a double-convex lens element, said second lens group consists of a cemented lens component having a meniscus shape convex on its image side, wherein said cemented lens component comprises, in order from the object side, a double-concave lens element and a double-convex lens element, and said cemented lens component includes a total of 3 lens elements at most, and said third lens group consists of, in order from the object side, a negative lens element and a positive lens element.

5. The rear converter lens apparatus of claim 4, wherein said third lens group consists of, in order from the object side, a double-concave lens element and a meniscus lens element convex on its object side and having positive refracting power.

6. The rear converter lens apparatus of claim 4, wherein:

an object-side surface of said negative lens element in said third lens group has an absolute value of refracting power larger than that of an image-side surface thereof, and an object-side surface of said positive lens element in said third lens group has an absolute value of refracting power larger than that of an image-side surface thereof.

7. The rear converter lens apparatus of claim 4, wherein:

said cemented lens component in said second lens group comprises, in order from the object side, said double-concave lens element, said double-convex lens element and a meniscus lens element convex on its image side, and said cemented lens component is a cemented triplet lens component.

8. The rear converter lens apparatus of claim 4, wherein:

said cemented lens component in said second lens group comprises, in order from the object side, said double-concave lens element and said double-convex lens element, and said cemented lens component is a cemented doublet lens component.

9. The rear converter lens apparatus of claim 4, wherein:

said first lens group consists of a cemented lens component where said meniscus lens element and said double-convex lens element are cemented together.

10. The rear converter lens apparatus of claim 1, wherein:

a mount surface located in the master lens device-side mount portion and nearest to an object side thereof lies more on the object side than a lens surface located in said converter lens portion and nearest to an object side thereof, with satisfaction of the following condition (3):

$$Dmr \leq 4.0 \text{ mm} \quad (3)$$

where Dmr is an axial distance from a position of the mount surface located nearest to the object side to the lens surface located in said converter lens portion and nearest to the object side thereof, provided that an image-side direction is positive.

11. The rear converter lens apparatus of claim 1, which satisfies the following condition (4):

$$2.4 \leq |F1/Frc| \leq 200.0 \quad (4)$$

where Frc is a total focal length of the converter lens portion, and

F1 is a focal length of the first lens group in the converter lens portion.

12. The rear converter lens apparatus of claim 1, which satisfies the following condition (5):

$$1.4 \leq |F2/Frc| \leq 2.4 \quad (5)$$

where Frc is a total focal length of the converter lens portion, and

F2 is a focal length of the second lens group in the converter lens portion.

13. The rear converter lens apparatus of claim 1, which satisfies the following condition 6):

$$0.2 \leq |F3/Frc| \leq 1.2 \quad (6)$$

where Frc is a total focal length of the converter lens portion, and

F3 is a focal length of the third lens group in the converter lens portion.

14. The rear converter lens apparatus of claim 1, which satisfies the following condition (7):

$$1.8 \leq \beta \leq 2.3 \quad (7)$$

where β is an imaging magnification of the converter lens portion.

15. A rear converter lens apparatus, comprising:

a master lens device-side mount portion for mounting a master lens device thereon, a camera body-side mount portion for mounting a camera body thereon, and a converter lens portion having generally negative refracting power so as to obtain a lens system having a focal length longer than that of said master lens device by mounting said master lens device, wherein:

said converter lens portion consists of, in order from an object side that is said master lens device side, a first lens group of positive refracting power, a second lens group of positive refracting power and a third lens group of negative refracting power, and there is a spacing between the respective lens groups, with satisfaction of the following conditions (1) and (2):

$$1.0 \leq |Frc/Bf| \leq 2.2 \quad (1)$$

$$0.5 \leq |\Sigma d/Frc| \leq 0.8 \quad (2)$$

where Frc is a total focal length of the converter lens portion, and

Bf is a back focus of a combined system of the master lens device and rear converter lens apparatus in the event that the master lens device having an attachable mount portion is mounted on the master lens device-side mount portion, and $\Sigma d$ is an axial distance of the converter lens portion from an entrance surface of a lens located nearest to the object side to an exit surface of a lens located nearest to the image side.

16. The rear converter lens apparatus of claim 15, wherein:
said first lens group consists of, in order from the object side, a meniscus lens element convex on its object side and having negative refracting power and a double-convex lens element,
said second lens group consists of a cemented lens component having a meniscus shape convex on its image side, wherein said cemented lens component comprises, in order from the object side a double-concave lens element and a double-convex lens element, and said cemented lens component includes a total of 3 lens elements at most, and
said third lens group consists of, in order from the object side, a negative lens element and a positive lens element.

17. The rear converter lens apparatus of claim 16, wherein said third lens group consists of, in order from the object side, a double-concave lens element and a meniscus lens element convex on its object side and having positive refracting power.

18. The rear converter lens apparatus of claim 16, wherein:
an object-side surface of said negative lens element in said third lens group has an absolute value of refracting power larger than that of an image-side surface thereof, and
an object-side surface of said positive lens element in said third lens group has an absolute value of refracting power larger than that of an image-side surface thereof.

19. The rear converter lens apparatus of claim 16, wherein:
said cemented lens component in said second lens group comprises, in order from the object side, said double-concave lens element, said double-convex lens element and a meniscus lens element convex on its image side, and
said cemented lens component is a cemented triplet lens component.

20. The rear converter lens apparatus of claim 16, wherein:
said cemented lens component in said second lens group comprises, in order from the object side, said double-concave lens element and said double-convex lens element, and
said cemented lens component is a cemented doublet lens component.

21. The rear converter lens apparatus of claim 16, wherein:
said first lens group consists of a cemented lens component where said meniscus lens element and said double-convex lens element are cemented together.

22. The rear converter lens apparatus of claim 15, wherein:
a mount surface located in the master lens device-side mount portion and nearest to an object side thereof lies more on the object side than a lens surface located in said converter lens portion and nearest to an object side thereof, with satisfaction of the following condition (3):

$$Dmr \leq 4.0 \text{ mm} \quad (3)$$

where Dmr is an axial distance from a position of the mount surface located nearest to the object side to the lens surface located in said converter lens portion and nearest to the object side thereof, provided that an image-side direction is positive.

23. The rear converter lens apparatus of claim 15, which satisfies the following condition (4):

$$2.4 \leq |F1/Frc| \leq 200.0 \quad (4)$$

where Frc is a total focal length of the converter lens portion, and

F1 is a focal length of the first lens group in the converter lens portion.

24. The rear converter lens apparatus of claim 15, which satisfies the following condition (5):

$$1.4 \leq |F2/Frc| \leq 2.4 \quad (5)$$

where Frc is a total focal length of the converter lens portion, and

F2 is a focal length of the second lens group in the converter lens portion.

25. The rear converter lens apparatus of claim 15, which satisfies the following condition (6):

$$0.2 \leq |F3/Frc| \leq 1.2 \quad (6)$$

where Frc is a total focal length of the converter lens portion, and

F3 is a focal length of the third lens group in the converter lens portion.

26. The rear converter lens apparatus of claim 15, which satisfies the following condition (7):

$$1.8 \leq \beta \leq 2.3 \quad (7)$$

where $\beta$ is an imaging magnification of the converter lens portion.

27. A taking system, comprising:
a rear converter lens apparatus comprising a master lens device-side mount portion and a camera body-side mount portion,
a master lens device having a mount portion attachable to said rear converter lens apparatus by way of said master lens device-side mount portion, and
a camera body having a mount portion attachable to said rear converter lens apparatus by way of said camera body-side mount portion, wherein:
said master lens device is a master lens device as recited in claim 1.

* * * * *